3,766,122
POLYISOBUTYLENE OXIDE COMPOSITIONS
Hideo Sawada, Keichi Ohata, and Nagayoshi Tsukane, Saitama, Japan, assignors to Daicel Ltd., Osaka, Japan
No Drawing. Filed July 20, 1972, Ser. No. 273,373
Claims priority, application Japan, Aug. 21, 1971, 46/63,865
Int. Cl. C08g 43/00
U.S. Cl. 260—30.4 R                                    1 Claim

ABSTRACT OF THE DISCLOSURE

Polyisobutylene oxide compositions containing 1–20 wt. percent, based on polyisobutylene oxide, of an α-olefin oxide or mixture of two or more α-olefin oxides of the general formula:

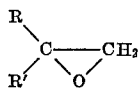

wherein each of R and R' represents hydrogen or a straight chain, saturated alkyl group, with the sum of the carbon atoms in R plus R', being in the range of from 14 to 40.

BACKGROUND OF THE INVENTION

Field of the invention

The present invention relates to plasticized, soft polyisobutylene oxide compositions of an excellent impact strength obtained by incorporating an α-olefin oxide in polyisobutylene oxide.

Description of the prior art

Conventional polyisobutylene oxide is a useful polymer having excellent mechanical strength and high crystallinity, but the polymer also has the disadvantages of poor softness and flexibility and insufficient impact strength.

SUMMARY OF THE INVENTION

We have found that softness, flexibility and impact strength can be imparted to polyisobutylene oxide by incorporating in it about 1–20 parts by weight, per 100 parts by weight of polyisobutylene oxide, of an α-olefin oxide or a mixture of two or more α-olefin oxides of the general formula:

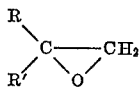

wherein each of R and R' represents hydrogen or a straight chain, saturated alkyl group, with the sum of the carbon atoms in R plus R' being in the range of 14 to 40.

As α-olefin oxides used in the present invention, there may be mentioned, for example, 1,2-epoxyhexadecane, 1,2-epoxyheptadecane, 1,2 - epoxyoctadecane, 1,2-epoxynonadecane, 1,2 - epoxyheneicosane, 1,2-epoxydocosane, 1,2-epoxytricosane, 1,2-epoxypentacosane, 1,2-epoxyhexacosane and 1,2-epoxynonacosane. As compounds of the above general formula wherein both R and R' represent alkyl groups, there may be mentioned a compound or mixture of compounds in which R and R' are members of the group consisting of ethyl, butyl, hexyl, octyl, decyl, dodecyl, tetradecyl, hexadecyl, octadecyl, eicosyl, docosyl, tetracosyl and hexacosyl groups, the sum of the carbon atoms in R plus R' being 14–40.

The purpose of the present invention cannot be attained by using α-olefin oxides in which the sum of the carbon atoms in R plus R' is 13 or less carbon atoms inclusive, or 41 or more carbon atoms inclusive, because the former has high volatility and the latter has poor compatibility with polyisobutylene oxide.

Polyisobutylene oxide in the present invention is a crystalline polymer of a high degree of polymerization obtained by polymerizing isobutylene oxide in the presence of, for example, an organozinc compound.

The compositions of the present invention may contain conventional amounts of additives, such as pigments, stabilizers or other fillers, depending upon the purpose of the resin compositions.

The compositions of the present invention have various advantages such as negligible volatility, stability against light and heat, as well as high mold releasing property from molding machines. The α-olefin oxides do not harm the transparency of the resin, they have excellent compatibility with the resin and they render unnecessary use of lubricant in the resin composition.

The α-olefin oxides of the present invention can be mixed easily with polyisobutylene oxide by usual means such as a blender, mixer, kneader and rolls. For example, the mixing can be effected with a hot roll machine or a suitable kneader or by dissolving or dispersing an α-olefin oxide in a suitable solvent, which solvent can be removed readily, and mixing the solution or dispersion with polyisobutylene oxide powder or pellets and then removing the solvent.

As described above, by using the polyisobutylene oxide compositions of the present invention, the impact strength, softness and flexibility of polyisobutylene oxide can be increased owing to the particular effect of α-olefin oxide having the structure shown by the above general formula, without deterioration of the other desirable properties of polyisobutylene oxide. In addition, polyisobutylene oxide moldings with excellent stability can be obtained easily without reduction in viscosity due to heat treatment. Thus, the compositions of the present invention are greatly valuable from the viewpoint of industrial uses.

The present invention will be illustrated by way of the following illustrative example.

The reduced viscosities in the example were determined with an Ubbelohde's viscometer at 110° C. in o-dichlorobenzene solution (concentration: 0.1 g./100 cc.).

EXAMPLE

Alpha-olefin oxides shown in Table 1 were mixed with polyisobutylene oxide powder (reduced viscosity=3.5) with a roll at 170° C. for 5 minutes.

The resulting compositions were heat-pressed at a temperature of 190° C. under a pressure of 100–140 kg./cm.$^2$ to obtain sheet samples about 1 mm. in thickness.

The resulting sheets were soft and the tensile elongation and the falling-ball impact strength thereof were superior to those of sheets containing no α-olefin oxide.

TABLE 1

| Run No. | Olefin oxide | Conc. of olefin oxide in polymer (wt. percent) | Tensile strength (kg./cm.$^2$) | Tensile elongation | Falling-ball impact strength (kg.-cm.) |
|---|---|---|---|---|---|
| 1 (control) | None | 0 | 400 | 20 | 4.5 |
| 2 | α-Olefin oxide of 20–28 carbon atoms | 1 | 395 | 30 | 7.5 |
| 3 | do | 5 | 395 | 45 | 10.5 |
| 4 | do | 10 | 390 | 60 | 12.0 |
| 5 | α-Olefin oxide of 30–40 carbon atoms | 5 | 390 | 30 | 12.0 |
| 6 | α-Olefin oxide of 14–16 carbon atoms | 5 | 395 | 30 | 7.5 |

The embodiments of the invention in which an exclusive property of privilege is claimed are defined as follows:

1. A synthetic resin composition consisting essentially of polyisobutylene oxide containing from 1 to 20 percent by weight, based on the weight of polyisobutylene oxide, of one or more α-olefin oxides of the formula

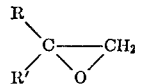

wherein R and R' is hydrogen or straight chain saturated alkyl, and the sum of the carbon atoms in R plus R' is in the range of from 14 to 40.

References Cited
UNITED STATES PATENTS

| | | | |
|---|---|---|---|
| 3,062,755 | 11/1962 | Hill et al. | 260—2 |
| 3,354,097 | 11/1967 | Vandenberg | 260—2 |
| 3,509,074 | 4/1970 | Kamio | 260—2 |

HAROLD D. ANDERSON, Primary Examiner

E. A. NIELSEN, Assistant Examiner

U.S. Cl. X.R.
260—2 A, 33.8 EP